(12) United States Patent
Nobukawa et al.

(10) Patent No.: US 10,385,753 B2
(45) Date of Patent: Aug. 20, 2019

(54) APPARATUS FOR DIAGNOSING DETERIORATION OF NOX STORAGE-REDUCTION CATALYST

(71) Applicant: TOYOTA JIDOSHA KABUSHIKI KAISHA, Toyota-shi, Aichi-ken (JP)

(72) Inventors: Takeshi Nobukawa, Toyota (JP); Tomomasa Aikawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 13 days.

(21) Appl. No.: 15/952,862

(22) Filed: Apr. 13, 2018

(65) Prior Publication Data

US 2018/0340459 A1 Nov. 29, 2018

(30) Foreign Application Priority Data

May 26, 2017 (JP) .................................. 2017-104886

(51) Int. Cl.
| | | |
|---|---|---|
| *F01N 11/00* | (2006.01) | |
| *F01N 3/08* | (2006.01) | |
| *F01N 3/10* | (2006.01) | |

(52) U.S. Cl.
CPC ............ *F01N 11/00* (2013.01); *F01N 3/0814* (2013.01); *F01N 3/0842* (2013.01); *F01N 3/10* (2013.01);
(Continued)

(58) Field of Classification Search
CPC ............... F01N 3/0842; F01N 2550/02; F01N 2550/03; F01N 2550/20; F01N 2560/026;
(Continued)

(56) References Cited

U.S. PATENT DOCUMENTS

2014/0050623 A1* 2/2014 Hagimoto ............. F01N 3/2066
422/82.12
2015/0143801 A1* 5/2015 Asaura .................... F01N 3/208
60/286

FOREIGN PATENT DOCUMENTS

JP 11093647 A * 4/1999 ............. F01N 11/00
JP 2004-301103 A 10/2004
(Continued)

*Primary Examiner* — Jonathan R Matthias
(74) *Attorney, Agent, or Firm* — Dickinson Wright, PLLC

(57) ABSTRACT

An apparatus for diagnosing deterioration of an NOx storage-reduction catalyst for purifying an exhaust gas discharged from an internal engine, including an intake air amount detection unit for detecting an intake air amount to the internal combustion engine, an exhaust gas temperature detection unit for detecting the temperature of an exhaust gas passing through the NOx storage-reduction catalyst, an NOx purification rate detection unit for detecting NOx in an exhaust gas flowing into the NOx storage-reduction catalyst and in an exhaust gas flowing out of the NOx storage-reduction catalyst, thereby detecting an NOx purification rate, and a diagnostic unit for, when the temperature of the exhaust gas passing through the NOx storage-reduction catalyst increases following an increase in the intake air flow rate to the internal combustion engine and in turn, the temperature of the NOx storage-reduction catalyst greatly increases over a first predetermined threshold value, calculating a difference in the NOx purification rate between before and after the rise of temperature of the NOx storage-reduction catalyst, and diagnosing the NOx storage-reduction catalyst as being deteriorated when the NOx purification rate difference is larger than a second predetermined threshold value.

6 Claims, 5 Drawing Sheets

(52) U.S. Cl.
CPC ...... *F01N 2550/02* (2013.01); *F01N 2550/03* (2013.01); *F01N 2560/026* (2013.01); *F01N 2560/06* (2013.01); *F01N 2900/04* (2013.01); *F01N 2900/1402* (2013.01); *F01N 2900/1404* (2013.01); *F01N 2900/1411* (2013.01); *F01N 2900/1621* (2013.01)

(58) Field of Classification Search
CPC ............ F01N 2560/07; F01N 2570/14; F01N 2900/1411; F01N 2900/1614; F01N 2900/1621
See application file for complete search history.

(56) References Cited

FOREIGN PATENT DOCUMENTS

| | | |
|---|---|---|
| JP | 2005-330848 A | 12/2005 |
| JP | 2008-215315 A | 9/2008 |
| JP | 2013-019401 A | 1/2013 |
| JP | 2013-024074 A | 2/2013 |
| JP | 2013-181453 A | 9/2013 |
| JP | 2014-031779 A | 2/2014 |

\* cited by examiner

APPARATUS FOR DIAGNOSING DETERIORATION OF NOX STORAGE-REDUCTION CATALYST

TECHNICAL FIELD

The present invention relates to an apparatus for diagnosing deterioration of a NOx storage-reduction catalyst.

BACKGROUND ART

As the catalyst for purifying nitrogen oxide (NOx) contained in an exhaust gas, a NOx storage-reduction catalyst (hereinafter, referred to as NSR catalyst) of absorbing and removing NOx contained in the exhaust gas is known. The NSR catalyst has an NOx storage/release action of absorbing NOx in a supplied exhaust gas by a storage material in the form of nitrate when the air-fuel ratio of the supplied exhaust gas is leaner than a predetermined value (typically, a theoretical air-fuel ratio), i.e., in an oxygen excess atmosphere, and releasing the absorbed NOx when the air-fuel ratio of the supplied exhaust gas is richer than the predetermined value, i.e., in an oxygen deficient atmosphere, allowing it to react with hydrocarbon (HC) with the aid of a catalyst such as platinum and be reduced to $N_2$ and discharged into outside air.

The reducing ability of the NSR catalyst tends to deteriorate due to poisoning by a sulfur component contained in the exhaust gas, abnormal heat generation, etc. Accordingly, various techniques for diagnosing deterioration of a catalyst have been developed so as to detect deterioration of the NSR catalyst and apply an appropriate treatment.

For example, Japanese Unexamined Patent Publication (Kokai) No. 2013-019401 describes a catalyst deterioration judging system where a temperature sensor for detecting the temperature of an NSR catalyst is disposed, the air-fuel ratio of an exhaust gas passing through the NSR catalyst is controlled to a rich air-fuel ratio of 14 or less, and when the temperature rise amount of the NSR catalyst here is less than a threshold value, the NSR catalyst is determined as being deteriorated.

SUMMARY OF THE INVENTION

In the system described in Kokai No. 2013-019401, control to a rich side is performed at the time of determination of deterioration, that is, a fuel is injected into the exhaust passage, and therefore, there is a problem that the fuel efficiency is reduced. In addition, at the present time, the exhaust gas temperature is lowered due to enhanced fuel efficiency, and the frequency of usage of the NSR catalyst in a low temperature region is increasing. Since the activity of the catalyst is insufficient in such a low temperature region, the conventional control to a rich side may incur slipping of an HC component added and cause a deleterious change in the exhaust gas.

The present inventors have focused on the fact that deterioration of the NSR catalyst is greatly attributed to the reduction in the NOx storage performance at a high temperature resulting from deterioration of a NOx storage material, and have found that by calculating the NOx purification rate at a maximum intake air amount during acceleration and the NOx purification rate at a maximum catalyst temperature after acceleration, when the difference therebetween is higher than a threshold value, the NSR catalyst can be detected to have deteriorated. The present invention has been accomplished based on this finding.

According to the present invention, the following deterioration diagnosis apparatus is provided.

[1] An apparatus for diagnosing deterioration of a NOx storage-reduction catalyst for purifying an exhaust gas discharged from an internal engine, including:

an intake air amount detection unit for detecting an intake air amount to the internal combustion engine, an exhaust gas temperature detection unit for detecting the temperature of an exhaust gas passing through the NOx storage-reduction catalyst, a NOx purification rate detection unit for detecting NOx in an exhaust gas flowing into the NOx storage-reduction catalyst and in an exhaust gas flowing out of the NOx storage-reduction catalyst, thereby detecting an NOx purification rate, and a diagnostic unit for, when the temperature of the exhaust gas passing through the NOx storage-reduction catalyst increases following an increase in the intake air flow rate to the internal combustion engine and in turn, the temperature of the NOx storage-reduction catalyst greatly increases over a first predetermined threshold value, calculating a difference in the NOx purification rate between before and after the rise of temperature of the NOx storage-reduction catalyst, and diagnosing the NOx storage-reduction catalyst as being deteriorated when the NOx purification rate difference is larger than a second predetermined threshold value.

[2] The deterioration diagnosis apparatus according to [1] above, wherein:

when the temperature of the exhaust gas passing through the NOx storage-reduction catalyst increases following an increase in the intake air flow rate to the internal combustion engine and the difference of a maximum temperature of the exhaust gas passing through the NOx storage-reduction catalyst from the temperature at a maximum intake air flow rate to the internal combustion engine exceeds a predetermined threshold value, the diagnostic unit calculates a difference between an NOx purification rate at a maximum intake air flow rate to the internal combustion engine and an NOx purification rate at a maximum temperature of the exhaust gas passing through the NOx storage-reduction catalyst, and diagnoses the NOx storage-reduction catalyst as being deteriorated when the NOx purification rate difference is larger than a predetermined threshold value.

[3] The deterioration diagnosis apparatus according to [1] above, wherein the exhaust gas temperature detection unit is an incoming gas temperature sensor disposed on the upstream side of the catalyst.

[4] The deterioration diagnosis apparatus according to [1] above, wherein the NOx purification rate detection unit calculates the NOx purification rate based on the following formula:

NOx purification rate=(NOx concentration in incoming gas−NOx concentration in outgoing gas)/ NOx concentration in incoming gas×100

[5] The deterioration diagnosis apparatus according to [1] above, wherein the first threshold value is 25° C. or more.

[6] The deterioration diagnosis apparatus according to [1] above, wherein the second threshold value is 50%.

In the deterioration diagnosis apparatus of the present invention, control to a rich side at the time of determination of deterioration is not necessary, so that reduction in the fuel efficiency can be prevented; and in addition, since deterioration can be detected in a pattern of acceleration and deceleration that are frequently repeated, the detection frequency can be increased, and the diagnosis accuracy is enhanced.

MODE FOR CARRYING OUT THE INVENTION

Figure 1:
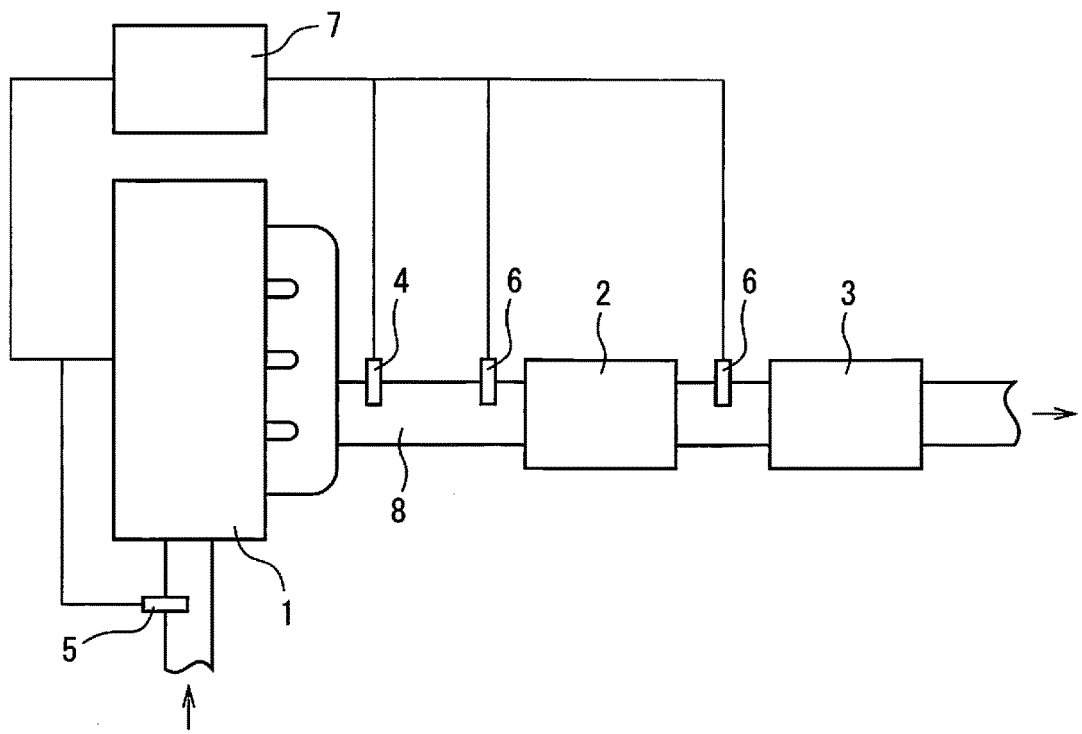
FIG. 1 is a schematic diagram illustrating the configuration of an internal combustion engine and an exhaust system thereof, to which the present invention is applied.

The mode for carrying out the present invention is described below by referring to drawings. FIG. 1 is a schematic diagram illustrating the configuration of an internal combustion engine and an exhaust system thereof, to which the present invention is applied. In the figure, 1 is an internal combustion engine, for example, a lean-burn engine or a diesel engine. An exhaust passage 8 is connected to the internal combustion engine 1, and an exhaust gas from the internal combustion engine 1 flows through the exhaust passage. The exhaust passage 8 is open to the atmosphere at the downstream end, and an NSR catalyst 2 is provided in the middle of the exhaust passage 8.

The NSR catalyst is constituted, for example, by including a support composed of an oxide such as alumina and carrying a catalyst component such as platinum and a NOx storage material on the support. As the NOx storage material, an alkali metal such as potassium and sodium, an alkaline earth metal such as barium and calcium, and a rare earth such as lanthanum and yttrium can be used. The NSR performs an NOx storage/release action of absorbing NOx in an exhaust gas in the form of nitrate when the air-fuel ratio of the inflowing exhaust gas is leaner than the theoretical air-fuel ratio, and releasing the stored NOx when the air-fuel ratio of the inflowing exhaust gas is equal to or richer than the theoretical air-fuel ratio. A catalyst (SCR) 3 having a function of selectively reducing NOx by use of a reducing gas component may be provided downstream of the NSR catalyst.

In addition, an electron control unit (hereinafter, referred to as ECU) 7 is disposed as a control means for controlling the engine as a whole. The ECU 7 is an arithmetic logic circuit composed of CPU, ROM, RAM, etc. and is a unit for controlling the operation state of the internal combustion engine 1 according to the operation conditions of the internal combustion engine 1 or a request from a driver.

Various sensors such as incoming gas temperature sensor 4, NOx sensor 5 and air amount sensor 6 are connected to ECU, and output signals of various sensors are input to the ECU 7.

In such an exhaust system, the NOx storage capacity is reduced due to deterioration of the NSR catalyst 2, and the deterioration of the NSR catalyst 2 reduces the NOx storage capacity from the high-temperature side. Because, the NOx storage material, for example, barium, related to the NOx storage capacity is subject to aggregation due to heat, and sulfur in the fuel adsorbs to coarsened barium to form a strong chemical bond and becomes a sulfate, which is considered to be a main factor.

Figure 2:
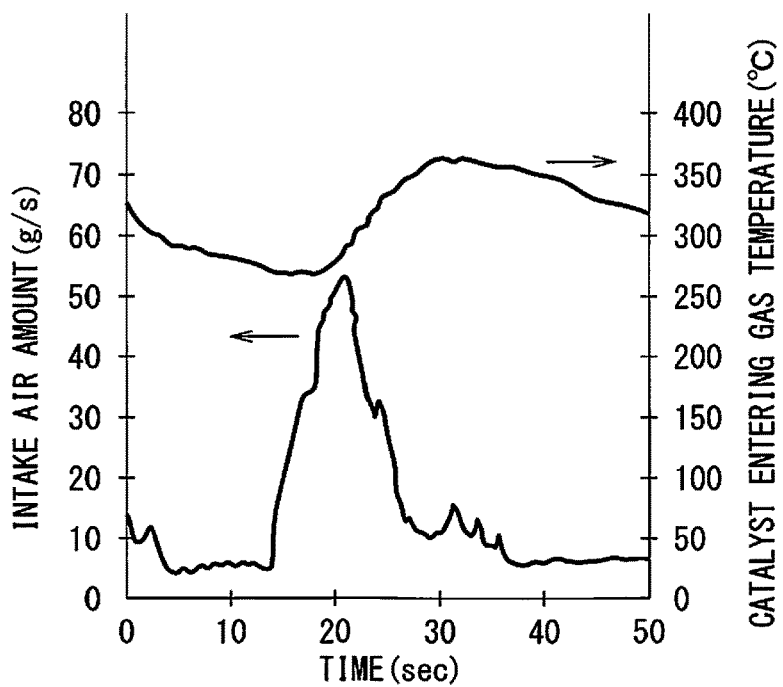
FIG. 2 is a graph illustrating the relationship between the catalyst temperature and the intake air amount at the time of acceleration.

Incidentally, as illustrated in FIG. 2, the present inventors have found that under operation conditions involving acceleration and deceleration, the catalyst temperature increases one step behind at the time of acceleration. In the deteriorated catalyst, the catalytic performance when the temperature increases is low for the reason above, and therefore, in the present invention, the deterioration diagnosis is performed based on a difference between the purification performance under the low catalyst temperature condition at the time of acceleration and the catalytic performance when the catalyst temperature increases after acceleration. More specifically, since the catalytic performance (NOx purification rate) of the deteriorated catalyst at a maximum catalyst temperature is low compared with a normal catalyst, the difference from the catalytic performance at a maximum intake air amount providing maximum NOx storage capacity increases, and when the difference is not less than a threshold value, the catalyst is diagnosed as being deteriorated. However, in order to ensure the detection accuracy, this is conditioned by the fact that the difference between the catalyst temperature at a maximum catalyst temperature and the catalyst temperature at a maximum intake air amount is not less than the threshold value.

Figure 3:
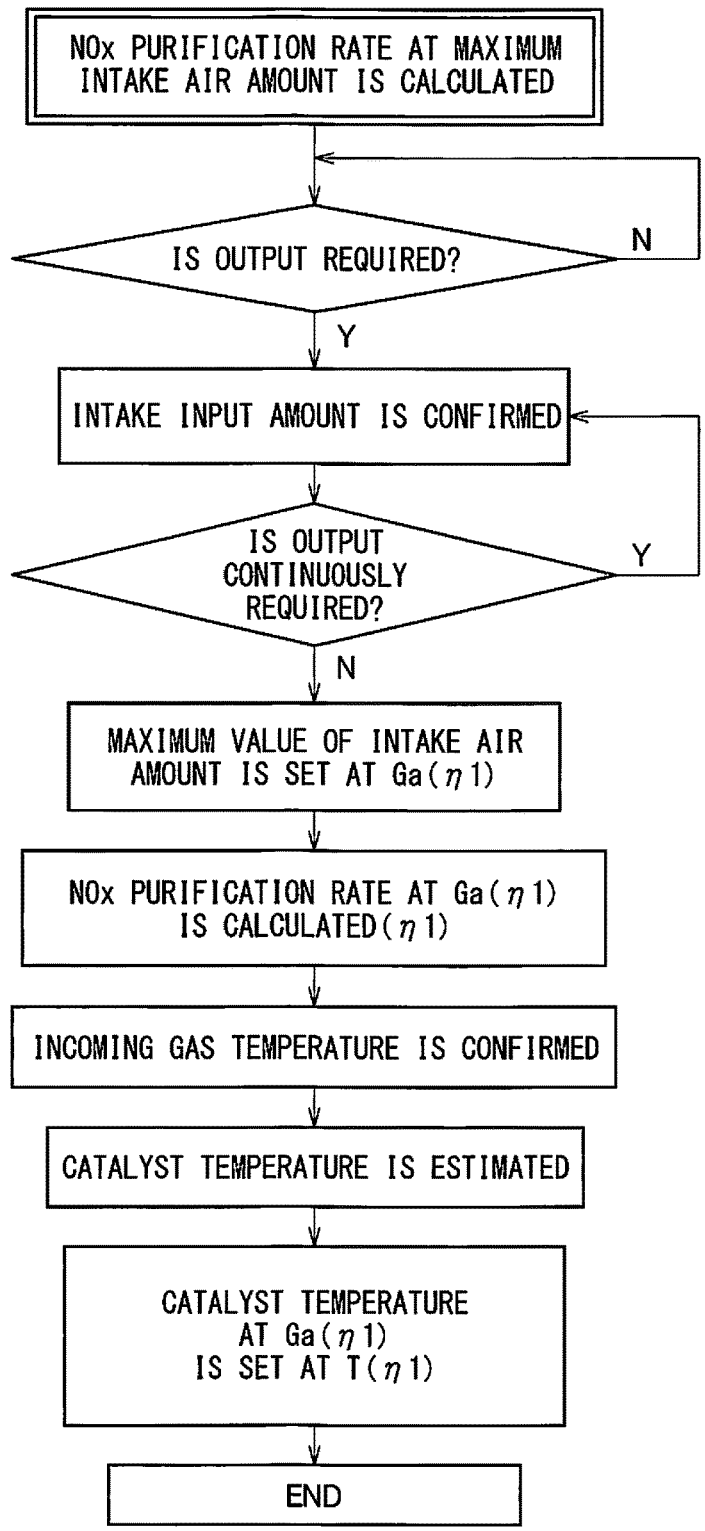
FIG. 3 is a flowchart illustrating the step of calculating the NOx purification rate at a maximum intake air amount.
Figure 4:
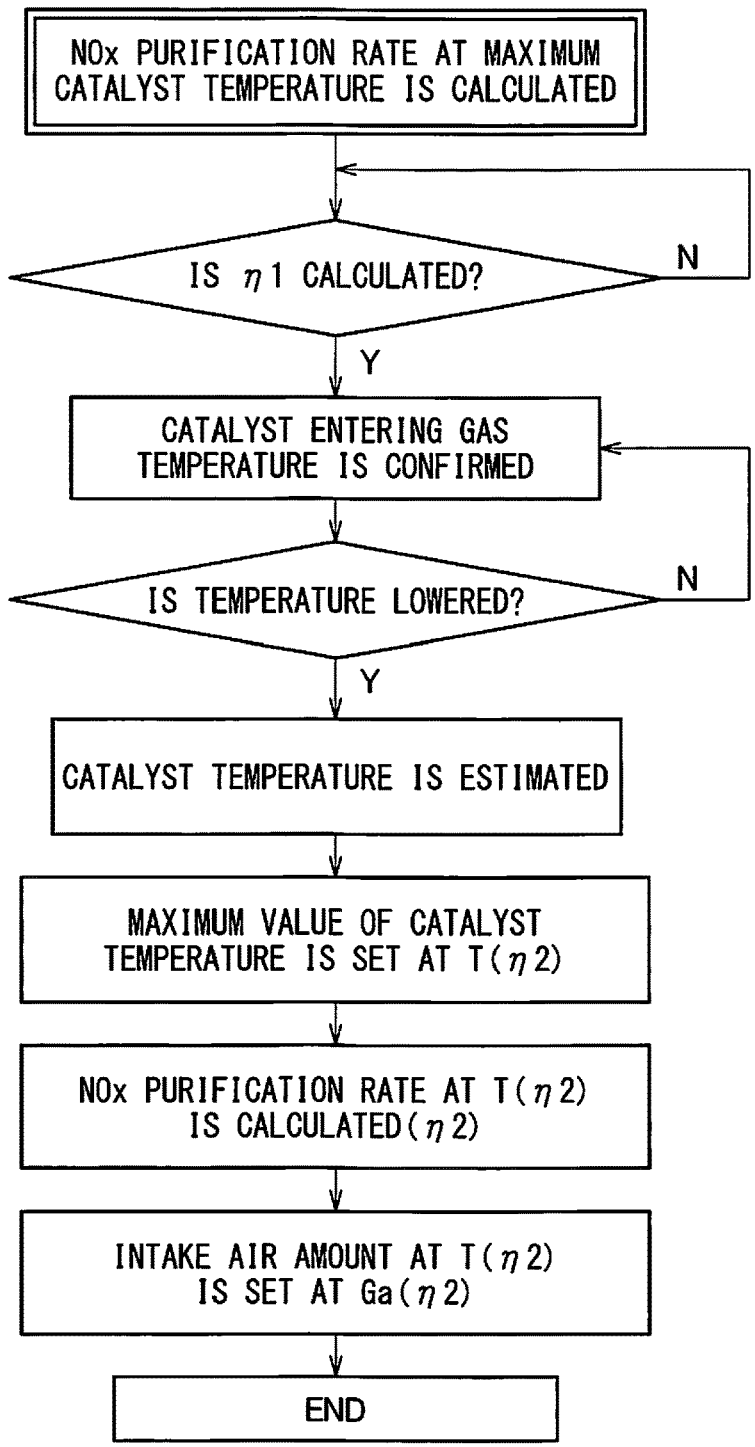
FIG. 4 is a flowchart illustrating the step of calculating the NOx purification rate at a maximum catalyst temperature.
Figure 5:
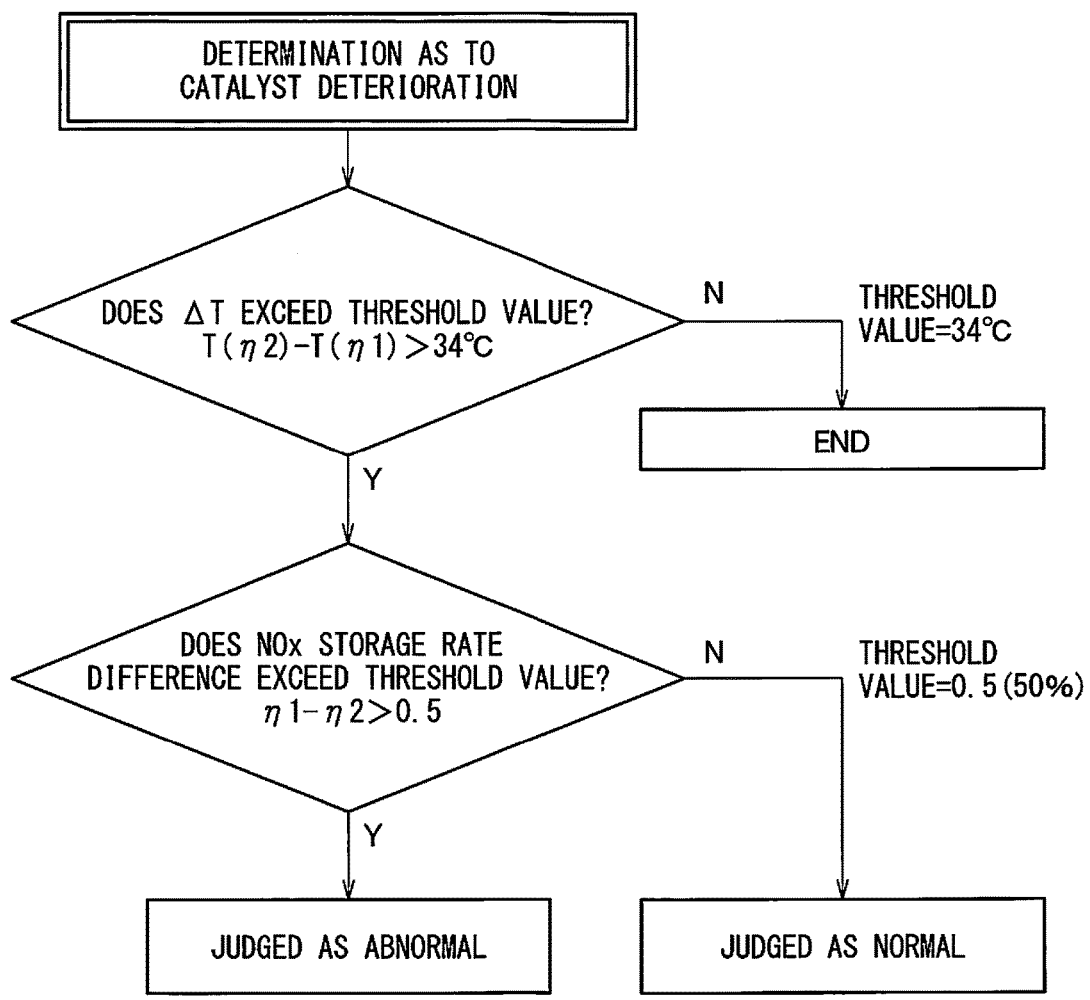
FIG. 5 is a flowchart illustrating the step of diagnosing catalyst deterioration based on the obtained NOx purification rates.

FIG. 3 is a flowchart illustrating the step of calculating the NOx purification rate at a maximum intake air amount, which is executed by ECU 7. FIG. 4 is a flowchart illustrating the step of calculating the NOx purification rate at a maximum catalyst temperature. FIG. 5 is a flowchart illustrating the step of diagnosing catalyst deterioration based on the obtained NOx purification rates.

To describe the step of calculating the NOx purification rate at a maximum intake air amount, as illustrated in FIG. 3, the intake air amount is first confirmed by an air amount sensor 6, and the value at a maximum intake air amount is set at Ga ($\eta 1$). Subsequently, the NOx purification rate ($\eta 1$) at Ga ($\eta 1$) is calculated. The NOx purification rate is determined from the NOx concentrations in incoming gas and outgoing gas measured by an NOx sensor 5 according to the following formula:

NOx purification rate=[(NOx concentration in incoming gas−NOx concentration in outgoing gas)/NOx concentration in incoming gas]×100

Here, NOx concentration in incoming gas−NOx concentration in outgoing gas means the concentration of NOx stored in the NSR catalyst.

Then, the incoming temperature is confirmed by an incoming temperature sensor 4, and the catalyst temperature (catalyst center temperature) is estimated. This catalyst temperature may be detected using a temperature detection unit for directly detecting the NSR catalyst temperature.

Finally, the catalyst temperature at Ga ($\eta 1$) is set at T ($\eta 1$), and the step is ended.

The step of calculating the NOx purification rate at a maximum catalyst temperature is described below. First, as illustrated in FIG. 4, the NOx purification rate ($\eta 1$) at Ga ($\eta 1$) is calculated, the incoming gas temperature is then confirmed by the incoming gas temperature sensor 4, the presence or absence of a temperature drop is examined, the catalyst temperature (catalyst center temperature) is estimated from the incoming gas temperature when a temperature drop is detected, and the temperature here is taken as a maximum value of catalyst temperature and set at T (η2). Subsequently, the NOx purification rate (η2) at T (η2) is calculated in the same manner as η1. Furthermore, the intake air amount at T (η2) is set at Ga (η2), and the step is ended.

Finally, the step of diagnosing catalyst deterioration is described. As illustrated in FIG. 5, the temperature difference (ΔT) between T (η2) as the maximum value of catalyst temperature and T (η1) set for the catalyst temperature at Ga (η1) is determined, and whether or not the difference is higher than a threshold value is determined. The threshold value is a temperature difference enabling recognition of sufficient catalyst deterioration and is previously determined by experiments and stored in ECU. In FIG. 5, the threshold value is 34° C. When the temperature difference is higher than 34° C., the difference (η1−η2) between the NOx purification rate (η1) at Ga (η1) and the NOx purification rate (η2) at T (η2) is determined, and when the determined difference is higher than a threshold value (in FIG. 5, 0.5), the catalyst is diagnosed as being deteriorated. This threshold value is also previously determined by experiments and stored in ECU.

According to such a configuration, the intake air amount, catalyst temperature and NOx concentration are measured at the time of transient operation, and the catalyst deterioration can thereby be diagnosed in ECU.

EXAMPLES

Preparation of Catalyst
(Preparation of Slurry for Underlayer Coating)

After mixing a 2 g portion as Pt amount of a dinitrodiammine platinum nitrate solution and a 0.2 g portion as Pd amount of a palladium nitrate solution with 200 g of ion-exchanged water, 65 g of alumina powder was mixed while stirring. The mixture was then heated while stirring and evaporated until dryness, and the obtained powder was fired at 500° C. in an electric furnace for 2 hours to obtain PtPd-Supported Alumina Powder (1).

In addition, 28.1 g of barium acetate was dissolved in 300 g of ion-exchanged water, and 170 g of 5% lanthanum-added cerium oxide was added. The mixture was heated while stirring and evaporated until dryness, and the obtained powder was fired at 500° C. in an electric furnace for 2 hours to obtain Ba-Supported CeO₂ Powder (2).

Slurry A was prepared by suspending 67.2 g of PtPd-Supported Alumina Powder (1) and 191.72 g of Ba-Supported CeO₂ Powder (2), obtained above, in 300 g of ion-exchanged water and adding an alumina binder.

(Preparation of Slurry for Overlayer Coating)

After mixing a 0.6 g portion as Pt amount of a dinitrodiammine platinum nitrate solution and a 0.3 g portion as Pd amount of a palladium nitrate solution with 100 g of ion-exchanged water, 30 g of alumina powder was mixed while stirring. The mixture was then heated while stirring and evaporated until dryness, and the obtained powder was fired at 500° C. in an electric furnace for 2 hours to obtain PtPd-Supported Alumina Powder (3).

In addition, a 0.3 g portion as Rh amount of a rhodium nitrate solution was mixed with 100 g of ion-exchanged water, and 30 g of alumina powder was mixed while stirring. The mixture was heated while stirring and evaporated until dryness, and the obtained powder was fired at 500° C. in an electric furnace for 2 hours to obtain Rh-Supported Alumina Powder (4).

Furthermore, 12.77 g of barium acetate was dissolved in 100 g of ion-exchanged water, and 45 g of 5% lanthanum-added cerium oxide was added. The mixture was heated while stirring and evaporated until dryness, and the obtained powder was fired at 500° C. in an electric furnace for 2 hours to obtain Ba-Supported CeO₂ Powder (5).

Slurry B was prepared by suspending 30.9 g of PtPd-Supported Alumina Powder (3), 30.3 g of Rh-Supported Alumina Powder (4) and 54.87 g of Ba-Supported CeO₂ Powder (5), obtained above, in 300 g of ion-exchanged water and adding an alumina binder.

(Coating of Catalyst)

Using Slurry A, a wash coat was applied to a portion corresponding to 100% of the total length from one end on the upstream side of a cordierite-made honeycomb substrate (1.38 L, 400 cells, 4 mil), dried and fired to form an underlayer coating part. Furthermore, using Slurry B, a wash coat is applied to a portion corresponding to 100% of the total length, dried and fired to form an overlayer coating part.

(Endurance of Catalyst)

Using a 2 L diesel engine, an endurance treatment of catalyst was performed by conducting a repetitive treatment of PM regeneration at a catalyst temperature of 680° C. for 62 hours and a sulfur-poisoning regeneration, and a normal catalyst was thereby obtained. On the other hand, as a catalyst for judging the deterioration of catalyst, a deteriorated catalyst was obtained by, after performing the endurance treatment above, further continuing a 200 hour endurance treatment until the purification performance was reduced.

(Evaluation of Catalyst)

The obtained catalyst was mounted in an exhaust system of a 2 L diesel engine, and a transient state evaluation was performed in an acceleration/deceleration operation pattern described in FTP mode. In order to confirm that the deterioration determination by a sensor is coincident with actual catalytic performance, the concentrations of NOx contained in an exhaust gas on the engine outlet side and in an exhaust gas on the NSR catalyst outlet side were measured using MEXA 9100 manufactured by HORIBA, Ltd.

The measurement results of the normal catalyst and the deteriorated catalyst are shown in Tables 1 and 2 below.

| Normal Catalyst | Catalyst Temperature During Measurement of η1 (° C.) | Catalyst Temperature During Measurement of η2 (° C.) | ΔT (temperature difference: T (η2) − T (η1)) | Intake Air Amount During Measurement of η1 | Intake Air Amount During Measurement of η2 | ΔGa (intake air amount difference: Ga (η1) − Ga (η2)) | Δη (storage efficiency difference) (η1 − η2) |
|---|---|---|---|---|---|---|---|
| Normal Catalyst Example 1 | 258 | 350 | 92 | 55 | 12 | 43 | 15 |
| Normal Catalyst | 277 | 345 | 68 | 58 | 22 | 36 | 0 |

-continued

| Normal Catalyst | Catalyst Temperature During Measurement of $\eta1$ (° C.) | Catalyst Temperature During Measurement of $\eta2$ (° C.) | $\Delta T$ (temperature difference: T ($\eta2$) − T ($\eta1$)) | Intake Air Amount During Measurement of $\eta1$ | Intake Air Amount During Measurement of $\eta2$ | $\Delta ga$ (intake air amount difference: Ga ($\eta1$) − Ga ($\eta2$)) | $\Delta \eta$ (storage efficiency difference) ($\eta1 - \eta2$) |
|---|---|---|---|---|---|---|---|
| Example 2 Normal Catalyst Example 3 | 243 | 277 | 34 | 32 | 13 | 19 | 15 |
| Normal Catalyst Example 4 | 248 | 288 | 40 | 25 | 17 | 8 | 35 |
| Normal Catalyst Example 5 | 262 | 280 | 18 | 35 | 16 | 19 | 45 |
| Normal Catalyst Example 6 | 242 | 285 | 43 | 40 | 8 | 32 | 0 |
| Normal Catalyst Example 7 | 175 | 255 | 80 | 52 | 30 | 22 | 30 |
| Normal Catalyst Example 8 | 290 | 388 | 98 | 65 | 22 | 43 | 30 |
| Normal Catalyst Example 9 | 191 | 210 | 19 | 35 | 12 | 23 | 70 |
| Normal Catalyst Example 10 | 126 | 180 | 54 | 35 | 14 | 21 | 40 |
| Normal Catalyst Example 11 | 63 | 100 | 37 | 43 | 9.7 | 33.3 | 50 |

| | Catalyst Temperature During Measurement of $\eta1$ (° C.) | Catalyst Temperature During Measurement of $\eta2$ (° C.) | $\Delta T$ (temperature difference: T ($\eta2$) − T ($\eta1$)) | Intake Air Amount During Measurement of $\eta1$ | Intake Air Amount During Measurement of $\eta2$ | $\Delta ga$ (intake air amount difference: Ga ($\eta1$) − Ga ($\eta2$)) | $\Delta \eta$ (storage efficiency difference) ($\eta1 - \eta2$) |
|---|---|---|---|---|---|---|---|
| Deteriorated Catalyst Example 1 | 270 | 350 | 80 | 53 | 12 | 41 | 95 |
| Deteriorated Catalyst Example 2 | 308 | 380 | 72 | 56 | 22 | 34 | 72 |
| Deteriorated Catalyst Example 3 | 188 | 295 | 107 | 24 | 10.3 | 13.7 | 95 |
| Deteriorated Catalyst Example 4 | 243 | 298 | 55 | 30 | 11 | 19 | 53 |
| Deteriorated Catalyst Example 5 | 266 | 308 | 42 | 25 | 15.5 | 9.5 | 75 |
| Deteriorated Catalyst Example 6 | 239 | 305 | 66 | 34 | 9.4 | 24.6 | 85 |
| Deteriorated Catalyst Example 7 | 245 | 299 | 54 | 38 | 10 | 28 | 70 |
| Deteriorated Catalyst Example 8 | 234 | 280 | 46 | 30 | 17 | 13 | 60 |
| Deteriorated Catalyst Example 9 | 184 | 210 | 26 | 36 | 15 | 21 | 40 |
| Deteriorated Catalyst Example 10 | 240 | 260 | 20 | 53 | 51 | 2 | 60 |
| Deteriorated Catalyst Example 11 | 128 | 178 | 50 | 36 | 32 | 4 | 90 |
| Deteriorated Catalyst Example 12 | 57 | 105 | 48 | 43 | 35 | 8 | 55 |

Figure 6:
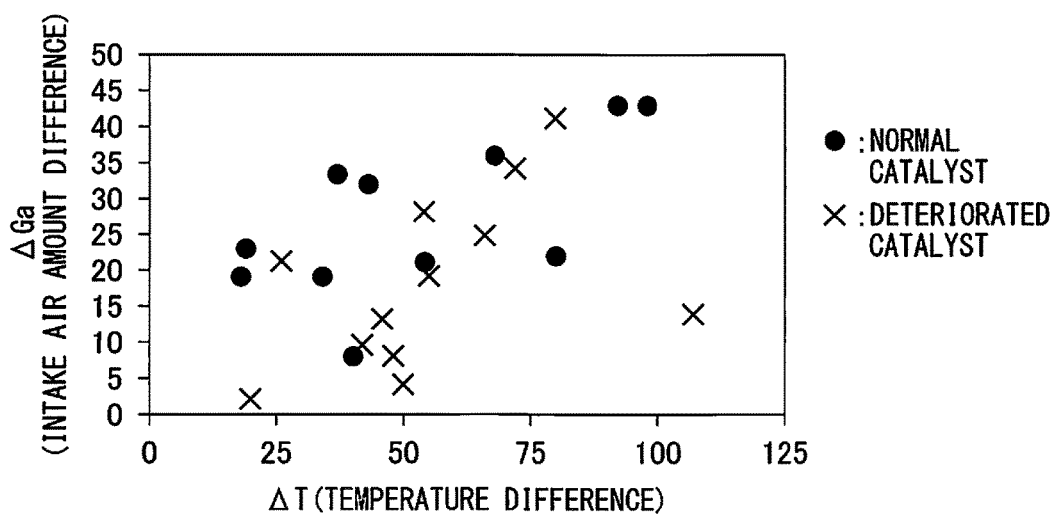
FIG. 6 is a graph illustrating the relationship between the intake air amount difference and the temperature difference of a catalyst measured in Examples.
Figure 7:
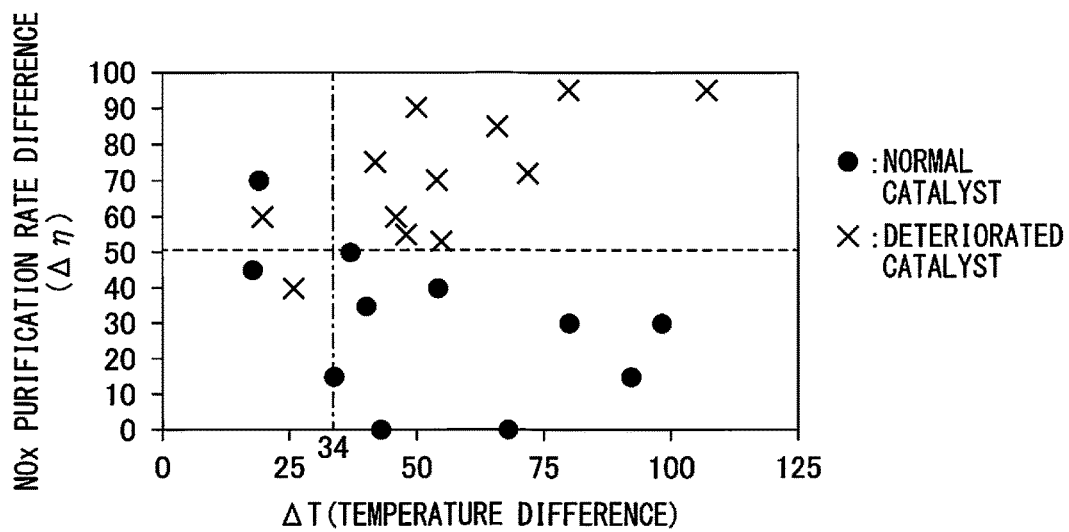
FIG. 7 is a graph illustrating the relationship between the NOx purification rate difference and the temperature difference of a catalyst measured in Examples.

Furthermore, these results are shown together in FIGS. 6 and 7. As illustrated in FIG. 6, the normal catalyst and the deteriorated catalyst are not different in terms of the relationship between the temperature difference and intake air amount of the catalyst, but as illustrated in FIG. 7, in the deteriorated catalyst, when the difference ($\Delta T$) between the temperature at a maximum catalyst center temperature of the NOx storage-reduction catalyst and the catalyst center temperature of the NOx storage-reduction catalyst at a maximum intake air amount is 34° C. or more, the difference between the NOx purification rate ($\eta2$) at a maximum catalyst center temperature and the NOx purification rate ($\eta1$) at a maximum intake air amount was 50% or more.

In this way, according to the catalyst deterioration diagnosis apparatus of Examples, the catalyst deterioration can be diagnosed from the difference between the NOx purification rate ($\eta2$) at a maximum catalyst center temperature and the NOx purification rate ($\eta1$) at a maximum intake air amount.

DESCRIPTION OF REFERENCE NUMERALS

1: Internal combustion engine
2: NSR Catalyst
3: SCR Catalyst
4: Incoming gas temperature sensor
5: NOx Sensor 6: Air amount sensor
7: ECU
8: Exhaust passage

What is claimed is:

1. An apparatus for diagnosing deterioration of a NOx storage-reduction catalyst for purifying an exhaust gas discharged from an internal engine, comprising:
    an intake air amount detection unit for detecting an intake air amount to the internal combustion engine,
    an exhaust gas temperature detection unit for detecting the temperature of an exhaust gas passing through the NOx storage-reduction catalyst,
    a NOx purification rate detection unit for detecting NOx in an exhaust gas flowing into the NOx storage-reduction catalyst and in an exhaust gas flowing out of the NOx storage-reduction catalyst, thereby detecting an NOx purification rate, and
    a diagnostic unit for, when the temperature of the exhaust gas passing through the NOx storage-reduction catalyst increases following an increase in the intake air flow rate to the internal combustion engine and in turn, the temperature of the NOx storage-reduction catalyst greatly increases over a first predetermined threshold value, calculating a difference in the NOx purification rate between before and after the rise of temperature of the NOx storage-reduction catalyst, and diagnosing the NOx storage-reduction catalyst as being deteriorated when the NOx purification rate difference is larger than a second predetermined threshold value.

2. The deterioration diagnosis apparatus according to claim 1, wherein:
    when the temperature of the exhaust gas passing through the NOx storage-reduction catalyst increases following an increase in the intake air flow rate to the internal combustion engine and the difference of a maximum temperature of the exhaust gas passing through the NOx storage-reduction catalyst from the temperature at a maximum intake air flow rate to the internal combustion engine exceeds a predetermined threshold value,
    the diagnostic unit calculates a difference between an NOx purification rate at a maximum intake air flow rate to the internal combustion engine and an NOx purification rate at a maximum temperature of the exhaust gas passing through the NOx storage-reduction catalyst, and diagnoses the NOx storage-reduction catalyst as being deteriorated when the NOx purification rate difference is larger than a predetermined threshold value.

3. The deterioration diagnosis apparatus according to claim 1, wherein the exhaust gas temperature detection unit is an incoming gas temperature sensor disposed on the upstream side of the catalyst.

4. The deterioration diagnosis apparatus according to claim 1, wherein the NOx purification rate detection unit calculates the NOx purification rate based on the following formula:

$$\text{NOx purification rate} = [(\text{NOx concentration in incoming gas} - \text{NOx concentration in outgoing gas})/\text{NOx concentration in incoming gas}] \times 100.$$

5. The deterioration diagnosis apparatus according to claim 1, wherein the first threshold value is 25° C. or more.

6. The deterioration diagnosis apparatus according to claim 1, wherein the second threshold value is 50%.

* * * * *